United States Patent
Baniel et al.

(10) Patent No.: US 8,989,056 B2
(45) Date of Patent: Mar. 24, 2015

(54) METHODS, SYSTEMS, AND COMPUTER READABLE MEDIA FOR UTILIZING QUOTA USAGE POLICY CONTROL IN A DIAMETER-BASED COMMUNICATION NETWORK

(71) Applicant: Tekelec, Inc., Morrisville, NC (US)

(72) Inventors: Uri Baniel, Buffalo Grove, IL (US); Manish Kumar Gupta, Pennington, NJ (US); Joseph Wonseok Lee, Pleasanton, CA (US)

(73) Assignee: Tekelec, Inc., Morrisville, NC (US)

( * ) Notice: Subject to any disclaimer, the term of this patent is extended or adjusted under 35 U.S.C. 154(b) by 109 days.

(21) Appl. No.: 13/735,670

(22) Filed: Jan. 7, 2013

(65) Prior Publication Data
US 2013/0176908 A1 Jul. 11, 2013

Related U.S. Application Data

(60) Provisional application No. 61/583,414, filed on Jan. 5, 2012.

(51) Int. Cl.
*H04L 12/16* (2006.01)
*H04L 12/14* (2006.01)

(52) U.S. Cl.
CPC ......... *H04L 12/1407* (2013.01); *H04L 12/1467* (2013.01); *H04L 12/1485* (2013.01)
USPC ....................................... 370/259

(58) Field of Classification Search
CPC ...... H04W 84/02; H04W 88/02; H04W 80/04
USPC .................. 370/259, 331, 342, 328, 335, 338; 705/30, 34
See application file for complete search history.

(56) References Cited

U.S. PATENT DOCUMENTS 5,570,416 A 10/1996 Kroll
6,195,543 B1 2/2001 Granberg
(Continued)

FOREIGN PATENT DOCUMENTS

CN 1323500 A 11/2001
CN 101971653 A 2/2011
(Continued)

OTHER PUBLICATIONS

Applicant-Initiated Interview Summary for U.S. Appl. No. 12/335,416 (Jan. 29, 2014).
(Continued)

*Primary Examiner* — Chi H Pham
*Assistant Examiner* — Alexander O Boakye
(74) *Attorney, Agent, or Firm* — Jenkins, Wilson, Taylor & Hunt, P.A.

(57) ABSTRACT

The subject matter described herein includes systems, methods, and computer readable media for utilizing quota usage policy control in a Diameter-based communication network. An exemplary method includes, at a policy server, sending a request for quota usage information associated with a subscriber to an online charging system (OCS) node. The method further includes receiving the quota usage information from the OCS node, generating at least one policy and charging control (PCC) rule for modifying a quality of service (QoS) policy attribute associated with the subscriber based on the quota usage information, and communicating the at least one PCC rule to a Diameter network element.

29 Claims, 10 Drawing Sheets

(56) References Cited

U.S. PATENT DOCUMENTS

| | | | |
|---|---|---|---|
| 6,393,269 | B1 | 5/2002 | Hartmaier et al. |
| 6,965,667 | B2 | 11/2005 | Trabandt et al. |
| 7,787,858 | B2 | 8/2010 | Koskinen et al. |
| 8,825,003 | B2 | 9/2014 | Ravishankar et al. |
| 2001/0040949 | A1 | 11/2001 | Blonder et al. |
| 2005/0136889 | A1 | 6/2005 | Zackrisson et al. |
| 2006/0148446 | A1 | 7/2006 | Karlsson |
| 2006/0286963 | A1 | 12/2006 | Koskinen et al. |
| 2007/0242816 | A1 | 10/2007 | Cai et al. |
| 2009/0061856 | A1 | 3/2009 | Kazmi |
| 2009/0156163 | A1 | 6/2009 | Ravishankar et al. |
| 2010/0010922 | A1 | 1/2010 | Foottit et al. |
| 2011/0208628 | A1* | 8/2011 | Foottit et al. .............. 705/34 |
| 2012/0202455 | A1 | 8/2012 | Cai |
| 2014/0273922 | A1 | 9/2014 | McMurry et al. |

FOREIGN PATENT DOCUMENTS

| | | |
|---|---|---|
| EP | 2 398 262 A1 | 12/2011 |
| JP | 2002-204319 | 7/2002 |
| WO | WO 00/19702 | 4/2000 |
| WO | WO 00/22871 | 4/2000 |
| WO | WO 03/073693 A1 | 9/2003 |
| WO | WO 2009/076675 A1 | 6/2009 |

OTHER PUBLICATIONS

Second Office Action for Chinese Patent Application No. 200880126771.8 (Sep. 4, 2013).

Non-Final Office Action for U.S. Appl. No. 12/335,416 (Oct. 23, 2013).

Interview Summary for U.S. Appl. No. 12/335,416 (May 20, 2013).

Notification of Transmittal of the International Search Report and the Written Opinion of the International Searching Authority, or the Declaration for International Application No. PCT/US2013/020528 (Apr. 29, 2013).

Commonly-assigned, co-pending U.S. Appl. No. 13/832,115 for "Methods, Systems, and Computer Readable Media for Adjusting a Quota Consumption Rate," (Unpublished, filed Mar. 15, 2013).

Final Office Action for U.S. Appl. No. 12/335,416 (Jan. 30, 2013).

First Office Action for Chinese Patent Application No. 200880126771.8 (Oct. 10, 2012).

Non-Final Official Action for U.S. Appl. No. 12/335,416 (Jun. 28, 2012).

Final Official Action for U.S. Appl. No. 12/335,416 (Dec. 6, 2011).

Tekelec et al., "Discussion paper on Usage-reporting from PCRF to OCS over Sy," 3GPP TSG SA WG2 #86, pp. 1-2 (Jul. 11-15, 2011).

Official Action for U.S. Appl. No. 12/335,416 (Apr. 20, 2011).

Ericsson et al., "IE provided over Sy interface," 3GPP TSG SA WG2 #83, TD S2-110980, pp. 1-7 (Feb. 2011).

Cheboldaeff, "Interaction between an Online Charging System and a Policy Server," ICN 2011: The Tenth International Conference on Networks, pp. 47-51 (2011).

Communication of European publication number and information on the application of Article 67(3) EPC for European application No. 08859561.6 (Sep. 1, 2010).

Notification of Transmittal of the International Search Report and the Written Opinion of the International Searching Authority, or the Declaration for corresponding International Application No. PCT/US2008/086866 (May 25, 2009).

"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).

Third Office Action for Chinese Patent Application No. 200880126771.8 (May 4, 2014).

Notice of Allowance and Fee(s) Due for U.S. Appl. No. 12/335,416 (May 2, 2014).

\* cited by examiner

METHODS, SYSTEMS, AND COMPUTER READABLE MEDIA FOR UTILIZING QUOTA USAGE POLICY CONTROL IN A DIAMETER-BASED COMMUNICATION NETWORK

PRIORITY CLAIM

This application claims the benefit of U.S. Provisional Patent Application Ser. No. 61/583,414 filed Jan. 5, 2012; the disclosure of which is incorporated herein by reference in its entirety.

TECHNICAL FIELD

The subject matter described herein relates to methods and systems for conducting policy control in a Diameter network. More particularly, the subject matter described herein relates to methods, systems, and computer readable media for utilizing quota usage policy control in a Diameter-based communication network.

BACKGROUND

Presently, communication network service providers offer a variety of different network services to mobile device subscriber users. Subscription plans offered by service providers are typically characterized by a combination of different performance categories and various quota amounts. For example, a subscriber user pays a monthly fee for a subscription plan with a given bandwidth speed, a given amount of download size quota, and/or a specific quality of service (QoS) level. Similarly, another subscriber user may subscribe to a subscription plan with a lower bandwidth speed, less quota allocation, and/or a lower QoS level. Regardless of the quota amount associated with a subscription plan, a service provider typically suspends the subscriber user's service if the subscriber user consumes the allotted quota. Alternatively, the network service provider can apply additional fees to the subscriber user's subscription plan to continue providing service in excess of the subscription plan quota. Although the aforementioned service providers are able to charge additional fees to continue a specific QoS in accordance to a subscription plan, service provider networks are currently not configured to dynamically adjust or modify policy control measures based on a subscriber user's network usage.

Accordingly, there exists a need for methods, systems, and computer readable media for utilizing quota usage policy control in a Diameter-based communication network.

SUMMARY

The subject matter described herein includes systems, methods, and computer readable media for utilizing quota usage policy control in a Diameter-based communication network. In one embodiment, an exemplary method includes, at a policy server, sending a request for quota usage information associated with a subscriber to an online charging system (OCS) node. The method further includes receiving the quota usage information from the OCS node, generating at least one policy and charging control (PCC) rule for modifying a quality of service (QoS) policy attribute associated with the subscriber based on the quota usage information, and communicating the at least one PCC rule to a Diameter network element.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for utilizing quota usage policy control in a Diameter-based communication network, such as a 4G network, a long term evolution (LTE) network, an Internet protocol multimedia subscriber (IMS) network, or any other network adapted to utilize the Diameter protocol. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
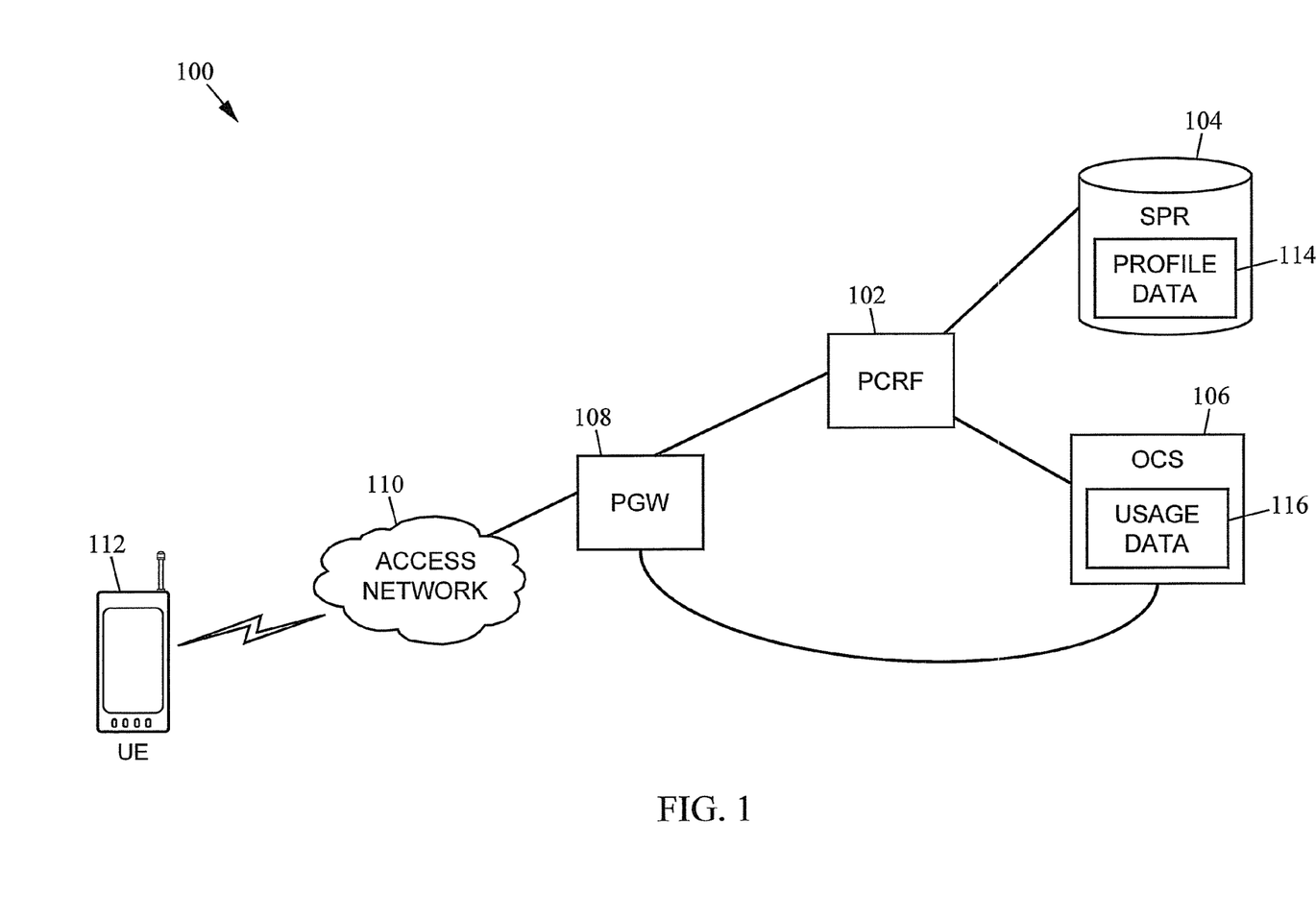
FIG. 1 is a block diagram illustrating an exemplary Diameter-based communication network utilizing quota usage policy control according to an embodiment of the subject matter described herein.

FIG. 1 is a block diagram illustrating an exemplary network 100 that includes a policy server, such as a policy and charging rules function (PCRF) 102, that is communicatively connected to a subscriber profile repository (SPR) 104, an online charging system (OCS) 106, and a packet data network (PDN) gateway (PGW) 108. In one embodiment, PCRF 102 may be configured to determine and create policy rules for subscriber users that subscribe to services in network 100. The policy rules created by PCRF 102 may pertain to services, QoS levels, and charging rules associated with each subscriber user on an individual basis. Policy rule determination and creation is described below in greater detail. In one embodiment, PCRF 102 may include a software module that is hosted and executed by any Diameter-based network element or server. Network 100 may also include an access network 110 that communicatively connects PGW 108 to a user equipment (UE) device 112 associated with a subscriber user. UE device 112 may include any mobile device, such as a mobile smart phone, a tablet computer device, a personal digital assistant (PDA), or the like.

According to one aspect of the present subject matter, PCRF 102 (or any other policy server) is configured to request tier level information associated with the subscriber user's subscription plan usage from OCS 106. The subscriber's tiered quota usage information may be requested and received via an application interface with OCS 106 (e.g., an Sy interface). In one embodiment, PCRF 102 may request the subscriber's tiered quota usage information from OCS 106 by sending a Diameter request message that may include at least one of Diameter session identifier information, subscriber identifier information (e.g., IMSI), subscriber tier information, subscriber service type identifier information, and/or subscriber rating group (RG) identifier information. Upon receiving the request, OCS 106 may be configured to use the provided information provided to determine the appropriate subscriber quota usage information, which may be ultimately returned to requesting PCRF 102.

In one embodiment, OCS 106 receives subscriber usage data (e.g., traffic and signaling data generated or received by UE 112) from PGW 108. OCS 106 may be configured to maintain a subscriber usage database 116 to record and store the subscriber usage data received from PGW 108. In one embodiment, OCS 106 may be configured to utilize usage database 116 to distinguish and keep track of specific data usage (e.g., on a per quota bucket basis) for each subscriber user.

PGW 108 may include any gateway element in network 100 that is configured to receive packet communications from UE 112 via access network 110 as well as reporting the usage associated with UE 112 to OCS 106 (e.g., via a Gy interface). PGW 108 may also be configured to provide network condition data (e.g., traffic load conditions) to PCRF 102. PGW 108 may also be configured to execute the policy rules provided by PCRF 102. In some embodiments, PGW 108 may include any network element configured to support or host at least one of a policy and charging enforcement function (PCEF), a bearer binding and event reporting function (BBERF), a deep packet inspection (DPI) function, a traffic detection function (TDF), or any other like network element function.

SPR 104 may include a database that is configured to store profile information pertaining to subscriber users of network 100. For example, the stored subscriber profile data may include a subscription plan code (e.g., a billing plan code or name) and the entitlements associated with the subscription plan code. Exemplary entitlements include, but are not limited to, voice over Internet protocol (VoIP) service, video chat, domestic roaming, international roaming, MiFi, data, gifts (e.g., special promotions), and specific equipment.

According to one embodiment of the present subject matter, UE 112 may register for services with the network in by initiating a network attachment procedure. For example, UE 112 can send a user attach request message to PGW 108. In response to receiving the attachment request message, PGW 108 may send a credit control request (CCR) message to PCRF 102. PCRF 102 may then send a user-data-request (UDR) message containing a subscriber user identifier to SPR 104 to request a subscription plan code and/or plan entitlements associated with the subscriber user. For example, SPR 104 may be configured to store subscription plan data in a local profile database 114. Alternatively, SPR 104 may query an external database containing the user's subscription plan information. After receiving the subscription plan information from SPR 104, PCRF 102 may be configured to check the status (e.g., "PC-Status") of one or more policy counter identifiers (PC-IDs) for a subscriber based on entitlements, the subscription plan code, and network conditions (e.g., a public land mobile network (PLMN)-ID). In some embodiments, the PC-ID may be a plan name (e.g., "gold plan") or a concatenated identifier that indicates a plan identifier and a plan subset identifier (e.g., "bucket" identifier). For example, the PC-ID of "5-1" may represent a plan identifier=5 and a bucket identifier=1. In some embodiments, PCRF 102 may include a database containing at least one mapping table. The mapping table may comprise a plurality of entries, wherein each entry may include entitlement(s), billing plan code, and/or a PLMN-ID. Each of the entries containing the various combinations of entitlement(s), billing plan code, and/or PLMN-ID may be mapped to a PC-ID.

After determining at least one PC-ID associated with a subscriber, PCRF 102 may send a request message to OCS 106 to request the PC-Status of the at least one PC-ID (e.g., a single PC-ID or list of PC-IDs). As used herein, the PC-Status may include an indication of a current tier level associated with a PC-ID. In one embodiment, the PC-Status may also include a Final Unit Action that may be taken by an enforcement node (e.g., a POW and/or PCEF) via the PCRF. An example of a Final Unit Action may be a redirection to a specific web portal for account recharging purposes. In another embodiment, the PC-Status may also include an activation time for the new PC-Status to take effect. Upon receiving the message, OCS 106 utilizes the received PC-ID(s) to access a local quota usage database 116 (or, alternatively, an accessible external database) to obtain the subscriber's usage data. For example, OCS 106 may use a subscriber user identifier and a PC-ID of "5-1" to determine a subscriber's current/remaining quota for a particular subset type of service. An example illustrating different tiered subscription plans (e.g., pricing or billing plans) and respective quota buckets is depicted in FIG. 2.

Figure 2:
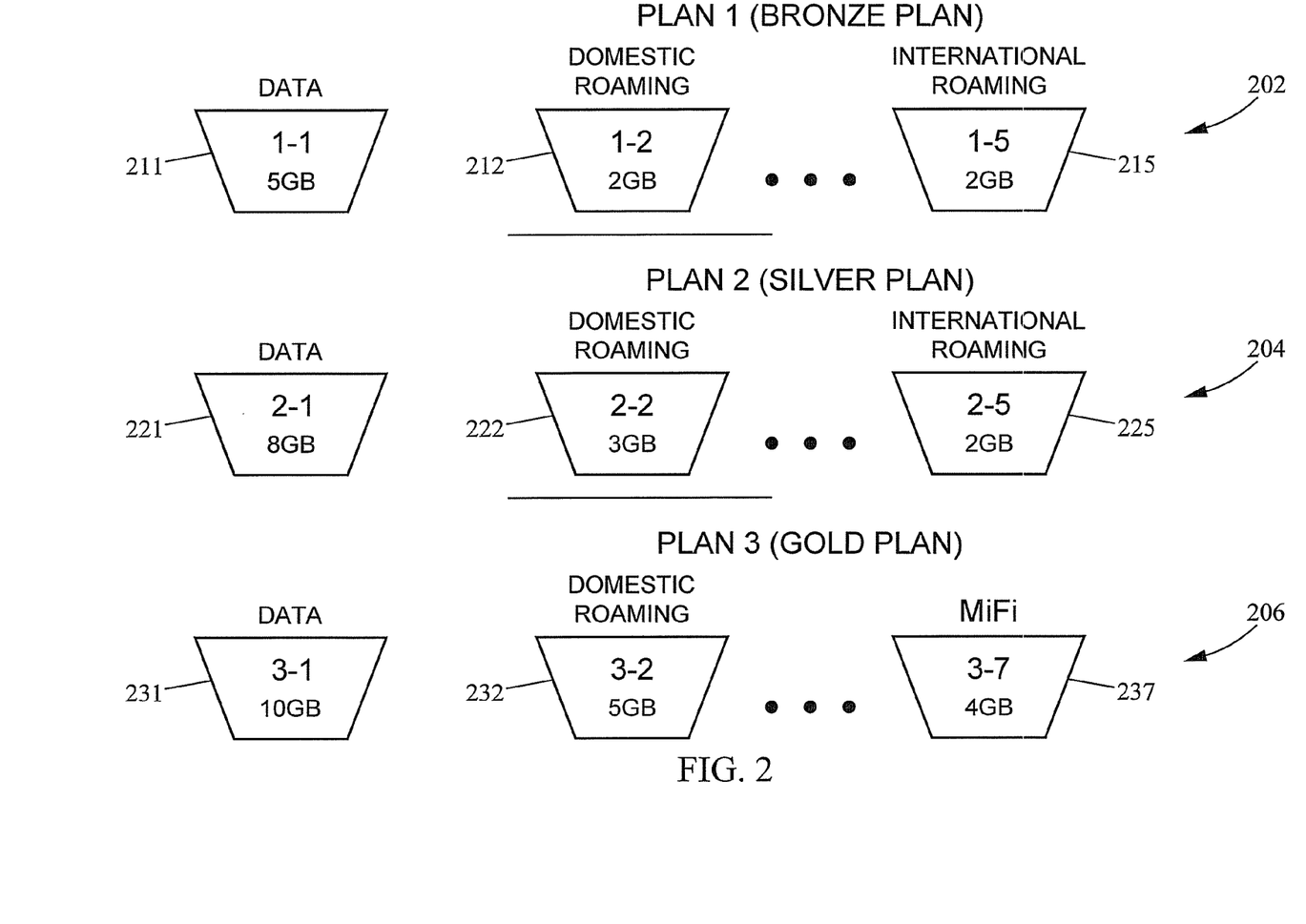
FIG. 2 is a block diagram illustrating exemplary subscription plans utilized for quota usage policy control according to an embodiment of the subject matter described herein.

Notably, FIG. 2 depicts a plurality of exemplary subscription plans, which include a "bronze plan" 202, a "silver plan" 204, and a "gold plan" 206. FIG. 2 further depicts that bronze plan 202 comprises a plurality of subsets or buckets, such as a data bucket 211 (which is identified by a PC-ID of "1-1"), a domestic roaming bucket 212 (which is identified by a PC-ID of "1-2"), and an international roaming bucket 215 (which is identified by a PC-ID of "1-5"). Specifically, FIG. 2 illustrates that bronze plan 202 includes an initial 5 GB quota allotment for data, an initial 2 GB quota allotment for domestic roaming, and an initial 2 GB quota for international roaming. These initial allotments may be allocated to a subscriber user for a subscribed duration at the beginning of a subscription cycle or time period, such at the start of the week (e.g., for a weekly subscription) or at the start of the month (e.g., for a monthly subscription). For example, a subscriber user with a subscription to bronze plan 202 may be allotted 2 GB for domestic roaming every month.

A network service provider may offer additional subscription plans with increased (or decreased) bucket quota allotments. For example, FIG. 2 illustrates silver plan 204 including a 8 GB data bucket 221, a 3 GB domestic roaming bucket 222, and a 2 GB international roaming bucket 225. Notably, each quota bucket is represented by its own PC-ID. Similarly, a network service provider may offer additional subscription plans with additional services or buckets. For example, FIG. 2 illustrates gold plan 206 including a 4 GB MiFi bucket 237 (in addition to a 10 GB data bucket 231, a 5 GB domestic roaming bucket 232) which is a service not included in bronze plan 202 or silver plan 204. Although FIG. 2 illustrates three different subscriptions plans, any number of subscription plans comprising any number of data buckets may be utilized without departing from the scope of the present subject matter.

In one embodiment, OCS 106 may retain up-to-date quota usage data for each subscriber user on a quota bucket basis. For example, as a subscriber user consumes/utilizes data and services in the network, PGW 108 may send usage data to OCS 106. Notably, as a particular type of data or service is consumed (and reported to OCS 106), OCS 106 updates a quota usage record corresponding to the appropriate bucket associated to the subscriber user (e.g., user's subscription plan). For example, if PGW 108 informs OCS 106 that a particular user subscribed to bronze plan 202 has utilized 250 kB of data, then OCS 106 subtracts 250 kB from the remaining quota amount associated with bucket 211.

Figure 3:
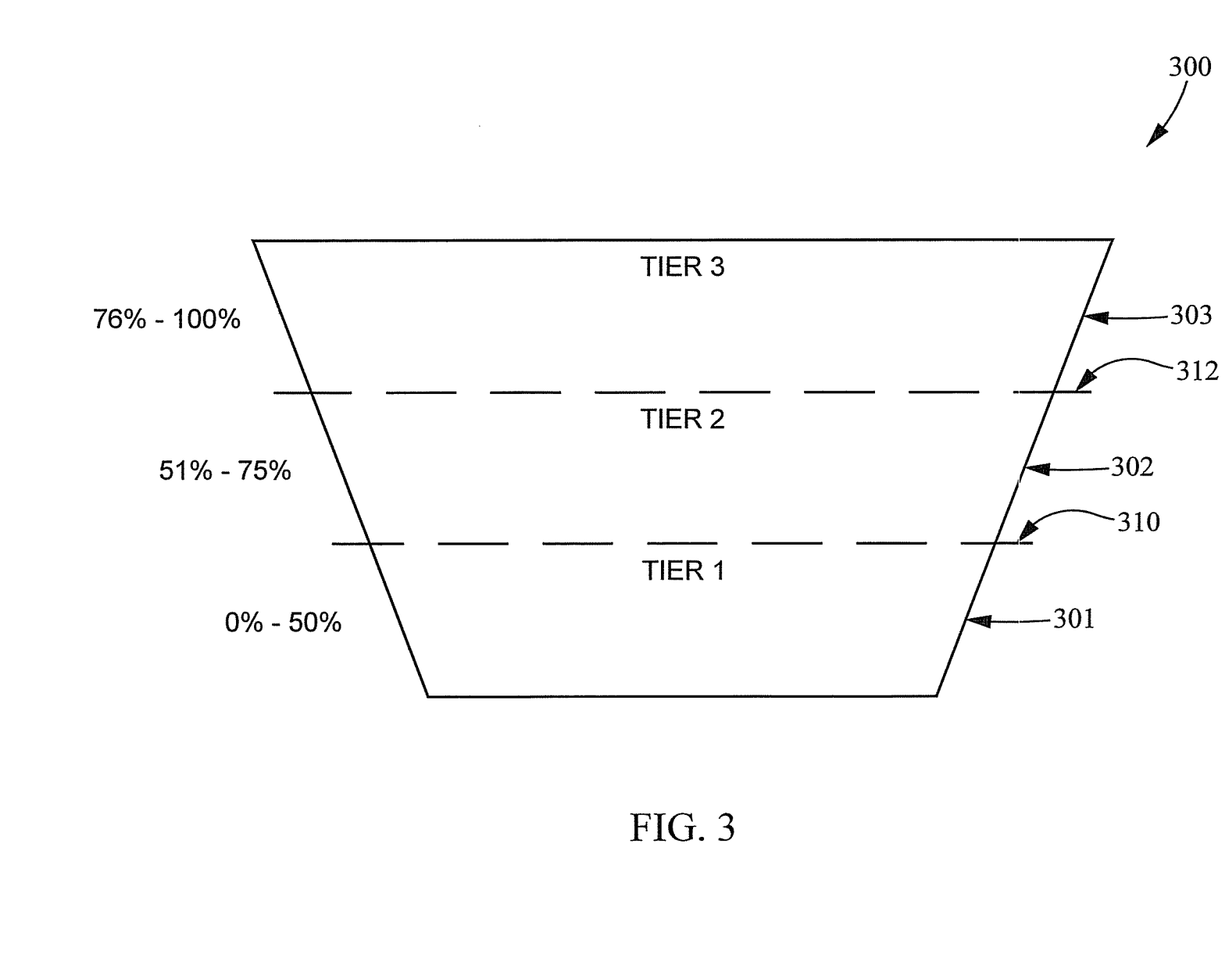
FIG. 3 is a block diagram illustrating an exemplary quota bucket according to an embodiment of the subject matter described herein.

FIG. 3 is a block diagram illustrating an exemplary quota bucket according to an embodiment of the subject matter described herein. Referring to FIG. 3, a quota bucket 300 is depicted having three tier levels. The three tier levels may include a first tier 301, a second tier 302, and a third tier 303. In one embodiment, quota bucket 300 may represent a data quota bucket representing a monthly allocation of 10 GB (not unlike bucket 231 in FIG. 2). For example, first tier 301 may comprise a 50% allocation or 5 GB of the 10 GB associated with quota bucket 300. Likewise, second tier 302 and third tier 303 may each comprise a 25% allocation or 2.5 GB of the GB associated with quota bucket 300. Referring to FIG. 3, first tier 301 and second tier 302 may be separated by a first threshold 310. In one embodiment, first threshold 310 is crossed when the subscriber user's data usage exceeds the amount of quota designated by first tier 301, or 5 GB in this example. Similarly, second tier 302 and third tier 303 may be separated by a second threshold 312. In one embodiment, second threshold 312 is crossed when the subscriber user's data usage exceeds the amount of quota designated by the cumulative upper limit of second tier 302, or 7.5 GB in total in this example (e.g., 5 GB of first tier+2.5 GB of second tier=7.5 GB cumulative total). Although FIG. 3 only illustrates three different tier levels, a quota bucket may include any number of tier levels and thresholds without departing from the scope of the present subject matter.

Notably, each tier level of quota bucket 300 includes its own unique traffic profile. For example, first tier 301 may be characterized by a traffic profile comprising a downlink speed of 3 Mbps, an uplink speed of 700 Kbps, a QoS class identifier (QCI) of 6, and a rating group (RG) identifier equal to 3100. In contrast, second tier 302 may be characterized by a traffic profile comprising a downlink speed of 1.5 Mbps, an uplink speed of 500 Kbps, a QoS class identifier (QCI) of 7, and a rating group (RG) identifier equal to 2900. Similarly, third tier 303 may be characterized by a traffic profile comprising a downlink speed of 1.0 Mbps, an uplink speed of 300 Kbps, a QoS class identifier (QCI) of 9, and a rating group (RG) identifier equal to 27. Thus, in quota bucket 300, first tier 301 is characterized by a traffic profile that includes greater bandwidth and throughput as compared to second tier 302 and third tier 303. In some embodiment, the traffic profile information associated with each respective tier level is maintained in a database at the PCRF. For example, the OCS may provide a pointer or reference number associated with the tier level (e.g., a tier level identifier) to the PCRF. The PCRF may then translate or map the tier level identifier to a corresponding traffic profile.

Returning to FIG. 1, OCS 106 may return a message (e.g., a spending limit report response message) to PCRF 102 after obtaining the status of each PC-ID requested. In one embodiment, the message may include a quota status and tier level status (e.g., PC-Status) for each of the PC-IDs requested by PCRF 102. PCRF 102 may then utilize the quota status and/or other conditions to determine or create one or more PCC rules to be applied to UE 112. For example, upon determining that a first tier threshold has been crossed (e.g., that the subscriber has used more than 50% of the allocated 10 GB quota in the first tier 301), PCRF 102 may access and invoke one or more predefined tier 1 threshold crossing actions. In one embodiment, a threshold crossing action may stipulate that one or more aspects of the subscriber's usage policy (e.g., subscription plan) be modified according to one or more policy rules. Exemplary threshold crossing actions include, but are not limited to, adjusting the download bitrate (e.g., decreasing the maximum allowed download bitrate), modifying an existing service data flow, terminating an existing service data flow, and the like. PCRF 102 may generate one or more associated policy and charging control (PCC) rules that include instructions to execute one or more of the threshold crossing actions at a network element. In some embodiments, PCRF 102 may utilize at least one or more of the received PC-Status information (e.g., PC-Service-Info), network condition data, subscriber user entitlements, tier level information, time of day, and other conditions to generate one or more PCC rule(s). For example, PCRF 102 may include a policy wizard that receives at least a portion of this collection of information as input and determines a number of actions (e.g., threshold crossing actions) that are executed based on current network and/or subscriber usage conditions. The policy wizard may be configurable and under a network operator's control. In one embodiment, the policy wizard may include a database that is preconfigured by a network operator and is subsequently accessed by PCRF 102 in real time. The policy wizard may also include a software application that is programmed or configured by a network operator that is then used by PCRF 102.

After PCRF 102 generates or determines the PCC rules, the PCC rules may be communicated from PCRF 102 to a network element such as a PCEF (e.g., PGW, GGSN) via a Gx interface. The PCEF is adapted to install and enforce the PCC rules to network traffic and signaling associated with a designated subscriber user. The PCC rules may be used by the PGW and/or PCEF to modify one or more QoS policy attributes associated with the designated subscriber user. For example, the PGW or PCEF (or some other Diameter network element) may apply a threshold crossing action included in the PCC rule(s) to data sent and received by UE 112 associated with the subscriber user. In other embodiments, a PCC rule or other policy rule may be communicated to a bearer binding and event reporting function (BBERF), a deep packet inspection (DPI) function, or a traffic detection function (TDF).

Figure 4:
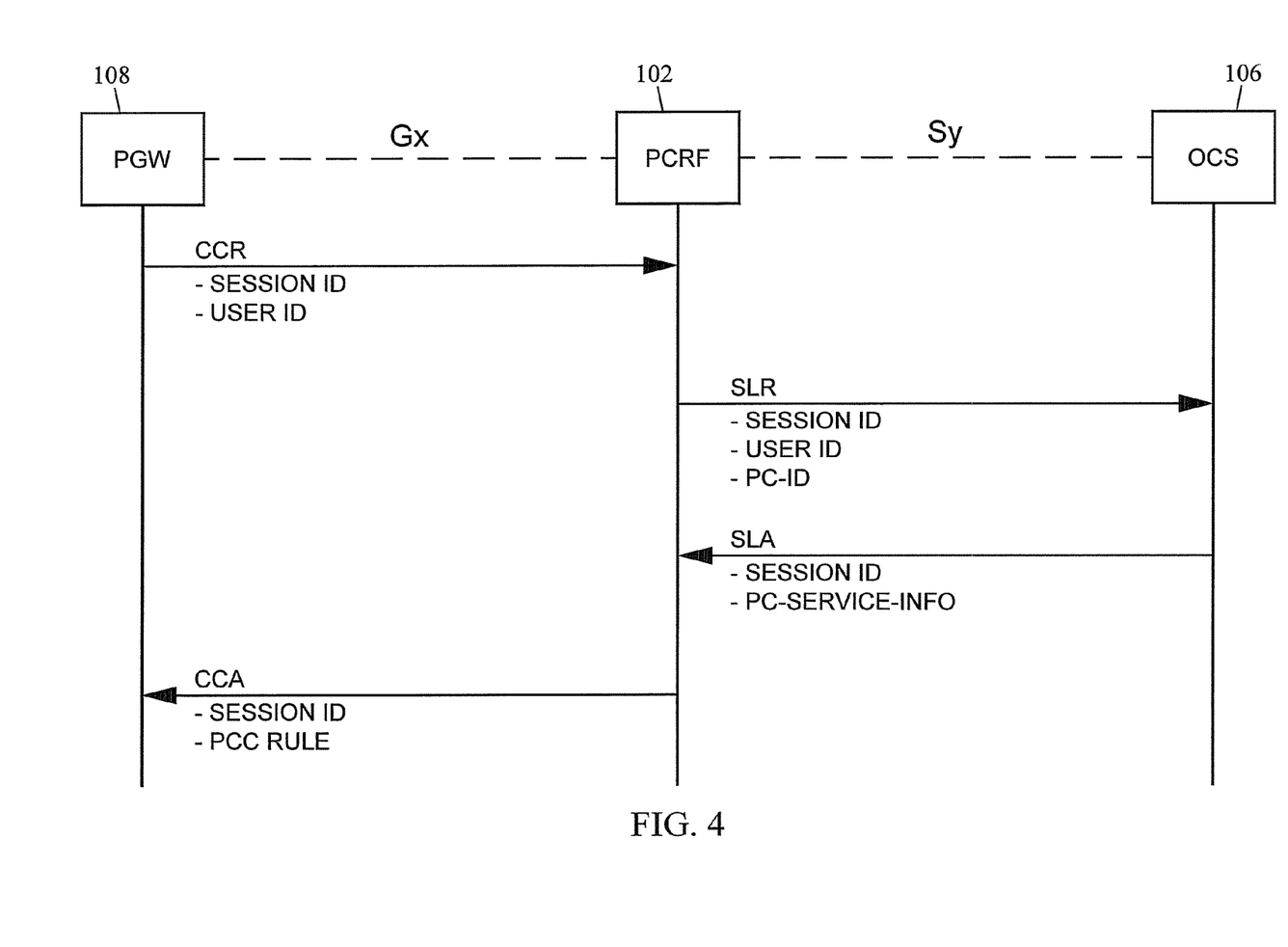
FIG. 4 is an exemplary message flow diagram illustrating the communication of signaling messages for establishing subscriber attachment to a network according to an embodiment of the subject matter described herein.

FIG. 4 depicts an exemplary message flow diagram illustrating the communication of signaling messages for establishing subscriber user attachment to a network. In the illustrated example, PGW 108 transmits a credit control request (CCR) message to PCRF 102. The CCR message may include a session identifier and a subscriber user identifier. In some embodiments, the CCR message is transmitted over a Gx interface session. In response, the PCRF 102 transmits a query and subscription request message, such as a spending limit report request (SLR) message, to OCS 106. As used herein, the query and subscription request message may be communicated over an Sy interface session. As used herein, the Sy interface session includes a dedicated and direct interface session existing between PCRF 102 and OCS 106. In one embodiment, the Sy session may be established when the subscriber user attaches to a network. The Sy interface session utilized in the present subject matter is defined in 3GPP TS 29.219. The query and subscription request message may also query for the PC-Service-Info pertaining to the PC-IDs included in the message as well as requesting a subscription for updates associated with the PC-IDs. In one embodiment, the query and subscription request message may include a spending limit report request message that may be communicated from PCRF 102 to OCS 106 via an Sy interface session. The query and subscription request message may include at least one of a session identifier, a subscriber user name, at least one PC-ID, a subscription plan identifier, and a quota bucket identifier. In some embodiments, the subscription plan identifier and quota bucket identifier may be combined or concatenated to create a program counter identifier (e.g., a PC-ID).

Upon receiving the query and subscription request message, OCS 106 may use at least one of the subscriber user name, the PC-ID, the subscription plan identifier, and the quota bucket identifier access to a database (e.g., either a local database or an external database) containing quota usage information. For example, OCS 106 may utilize the received PC-ID obtain a subscriber's network usage information. The quota usage information may include PC-Service-Info, such as the current tier level associated with the quota bucket identifier and/or the remaining quota amount in the corresponding tier level. For example, if the PC-ID received by OCS 106 identifies a first quota bucket in a second subscription plan (e.g., PC-ID="2-1") offered by a network service provider, then OCS 106 may use the PC-ID to obtain i) the current tier level (e.g., "tier level no. 3") and ii) the amount of remaining quota in the quota bucket (e.g., "3 GB remaining for tier level no. 3"). OCS 106 may be configured to generate and send a response message including this current tier level and remaining quota information to PCRF 102. In one embodiment, the response message may include a spending limit report answer (SLA) message containing at least a session identifier and the PC-Service-Info, which is sent over the Sy interface session.

After receiving the SLA message from OCS 106, PCRF 102 may extract the quota usage information and tier level information from the response message to generate a PCC rule. In some embodiments, PCRF 102 utilizes the extracted usage information obtained from OCS 106 as well as current network condition data (e.g., previously obtained from PGW 108) to determine the PCC rule(s) to be applied to the subscriber user.

Once the PCC rule(s) is determined PCRF 102 may be configured to generate and send a credit control answer (CCA) message containing a session identifier, and the PCC rule(s) to PGW 108. In some embodiments, the RAR message is sent by PCRF 102 to PGW 108 via a Gx interface connection. In response, PGW 108 generates and sends a re-authorization answer (RAA) message back to PCRF 102, which includes the session identifier and a response code. In some embodiments, the RAA message is sent by PGW 108 to PCRF 102 via a Gx interface connection.

Figure 5:
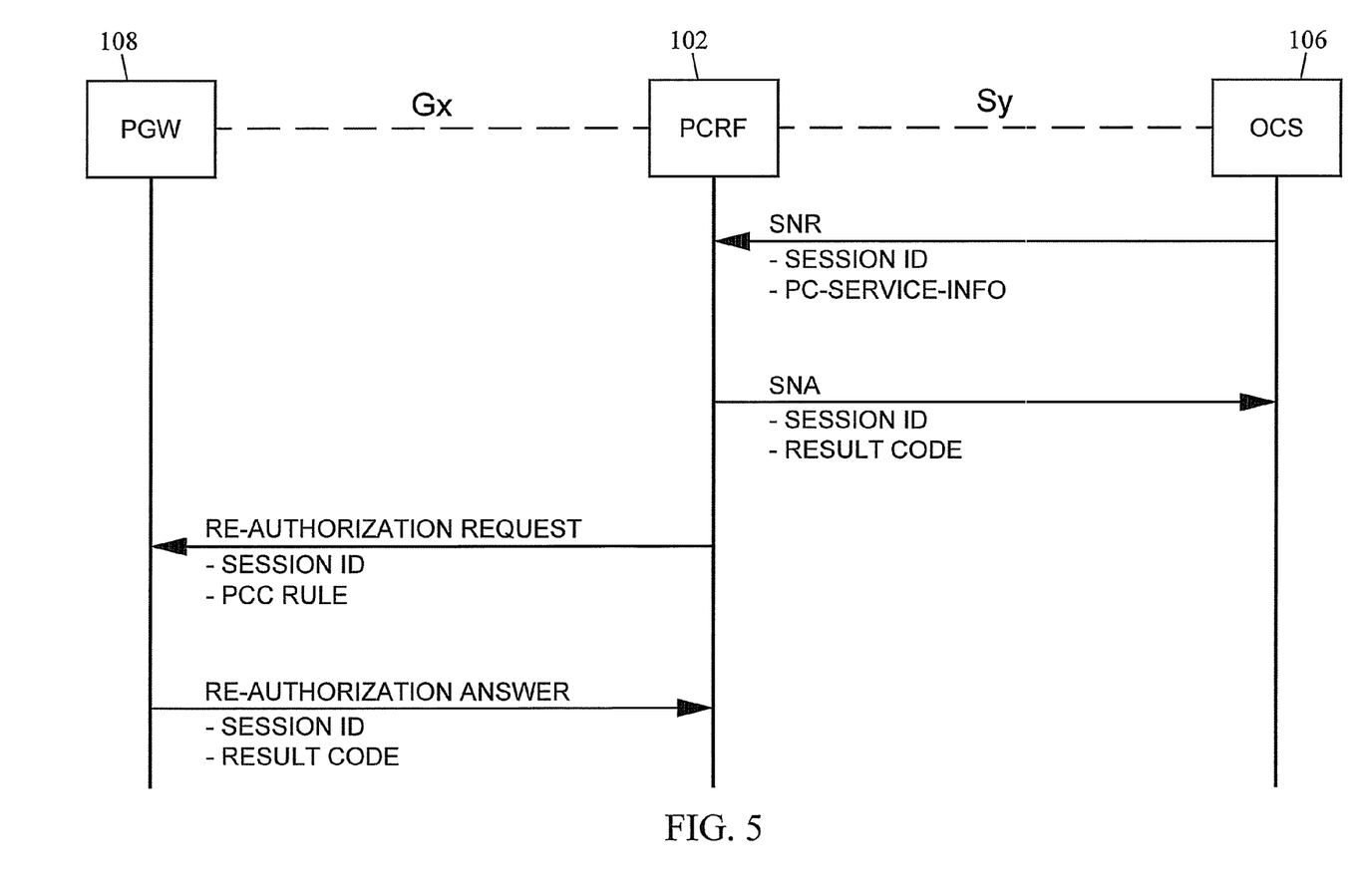
FIG. 5 is an exemplary message flow diagram illustrating the communication of signaling messages related to an asynchronous status notification associated with a policy counter identifier according to an embodiment of the subject matter described herein.

FIG. 5 depicts an exemplary message flow diagram illustrating the communication of signaling messages relating to an asynchronous status notification associated with a policy counter identifier (PC-ID). In the illustrated example, OCS 106 sends an asynchronous notification message, such as a subscribe notification request (SNR) message to PCRF 102 over an Sy interface session. The SNR message may include at least a session identifier and PC-Service-Info. As mentioned above, the PC-Service-Info may include any status information or data related to one or more PC-IDs associated with a subscriber user.

Upon receiving the SNR message over the Sy interface session, PCRF 102 may transmit a subscribe notification answer (SNA) message containing a session identifier and a result code back to OCS 106. PCRF 102 may also extract the PC-Service-Info (e.g., tier level information) from the received SNR message to generate a PCC rule. In some embodiments, PCRF 102 utilizes the extracted tier level information obtained from OCS 106 as well as current network condition data (e.g., previously obtained from PGW 108) to create and/or determine at least one PCC rule.

Once the PCC rule(s) is determined, PCRF 102 may be configured to generate and send a RAR message containing a session identifier, the subscriber user name, and the PCC rule(s) to PGW 108. In some embodiments, the RAR message is sent by PCRF 102 to PGW 108 via a Gx interface session. In response, PGW 108 generates and sends a RAA message back to PCRF 102, which includes the session identifier and subscriber user name. In some embodiments, the re-authorization answer message is sent by PGW 108 PCRF 102 to via a Gx interface connection.

Figure 6A:
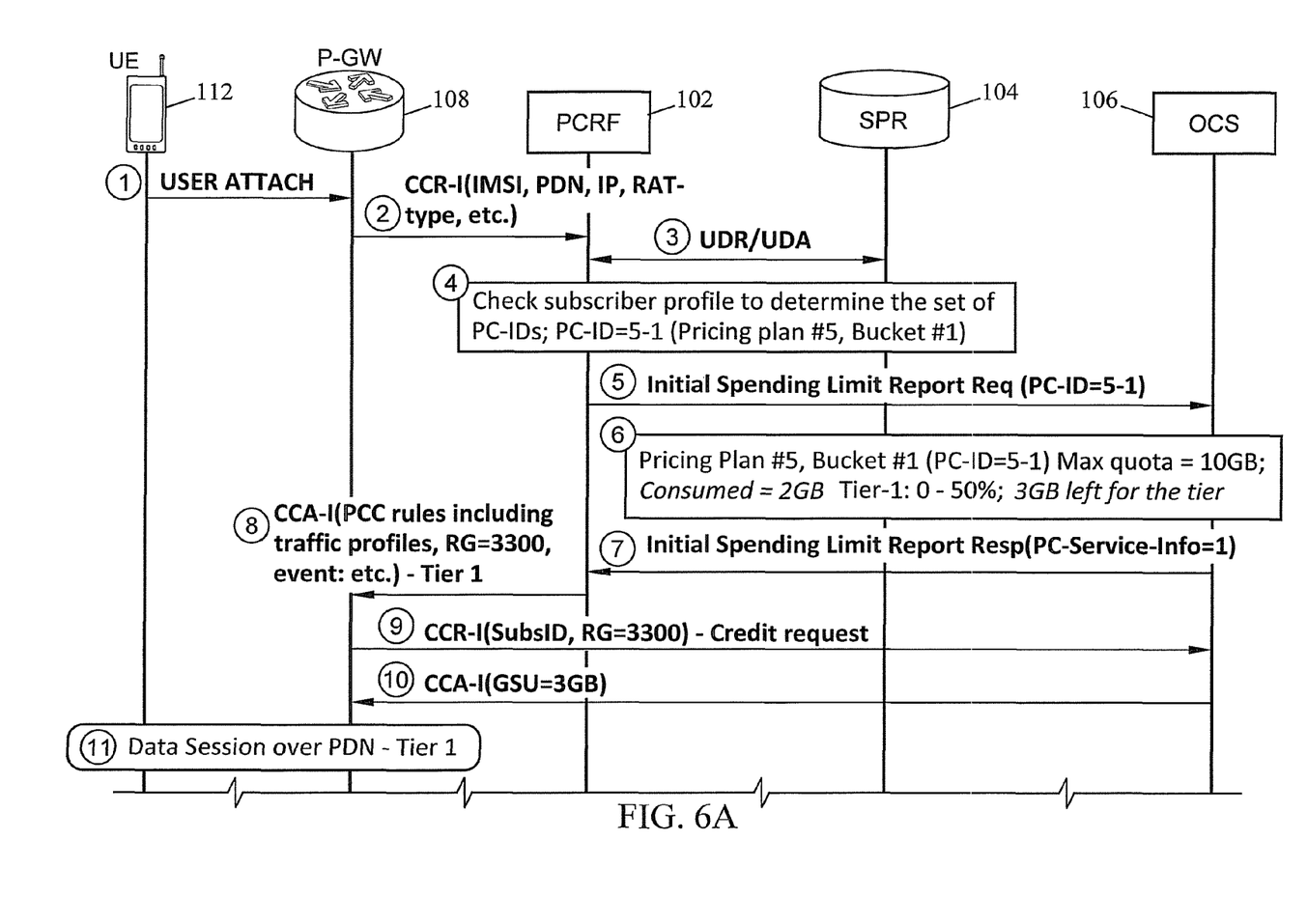
FIGS. 6A and 6D are an exemplary message flow diagram illustrating a multiple tier billing scenario according to an embodiment of the subject matter described herein.

FIGS. 6A-6D are an exemplary message flow diagram illustrating a multiple tier billing scenario according to an embodiment of the subject matter described herein. Referring to FIG. 6A, UE 112 sends an attachment request message to packet gateway 108, which responds by transmitting a credit control request (CCR) message to PCRF 102. PCRF 102 then sends a user-data-request (UDR) message to SPR 104. In response, SPR 104 accesses a database containing subscriber profile information. SPR 104 may then send a user-data-answer (UDA) message containing the subscriber profile information to PCRF 102. In some embodiments, the UDA message may include a subscription plan identifier/code and subscriber user entitlements.

In one embodiment, PCRF 102 may then check the subscriber profile to determine at least one PC-ID. If the PC-ID is identified as "5-1", then the PC-ID identifies a pricing plan no. 5 and an associated quota bucket no. 1. PCRF 102 may then send an initial spending limit report request message, which includes the PC-ID of 5-1, to OCS 106. In response, OCS 106 may determine that a quota bucket no. 1 of pricing plan no. 5, is characterized by the following: i) a maximum quota=10 GB, ii) data consumed=2 GB, and iii) tier level information (e.g., Tier No. 1: 0-50%; 3 GB remaining for the tier). As shown in FIG. 6A, OCS 106 may then send an initial spending limit report response message to PCRF 102 that includes PC-Service-Info data field that is set equal to 1, e.g., PC-Service-Info=1. The PC-Service-Info data=1 indication signifies that the quota bucket is currently in the first tier). In some embodiments, the PC-Service-Info (which is also called the PC-Status) may include i) information that indicates a bucket's current tier level and ii) additional data pertaining to the bucket's tier level (e.g., that the bucket's tier level will reset to an initial tier 1 in a defined time period due to a resetting billing cycle). The PC-Service-Info may also include consumed quota information, available/remaining quota information, and/or additional directives for a subscriber user (e.g., a redirection command to redirect the subscriber user to a specific web portal). The PC-Service-Info may include any additional data. In some embodiments, the notification may include any kind of information as agreed in advance between the PCRF and the OCS.

After receiving the initial spending limit report response message, PCRF 102 is configured generate or determine at least one PCC rule. In this example, PCRF 102 determines that the subscriber user is still operating in a first tier for data use. Since there is no change in tier level, PCRF 102 does not need to create any policy changes (e.g., PCC rules). In one embodiment PCRF 102 is configured to send a credit control answer (CCA) message to PGW 108. In one embodiment, the CCA message includes PCC rules that include traffic profile data and includes a rating group (RG) identifier of 3300. PGW 108 may then send a CCR message, which contains the subscriber identifier and RG number, to make a credit request from OCS 106. OCS 106 responds with a CCA message that indicates that the subscriber has 3 GB remaining. At this time, a tier 1 data session over the packet data network (PDN) is established for UE 112 by PGW 108.

Figure 6B:
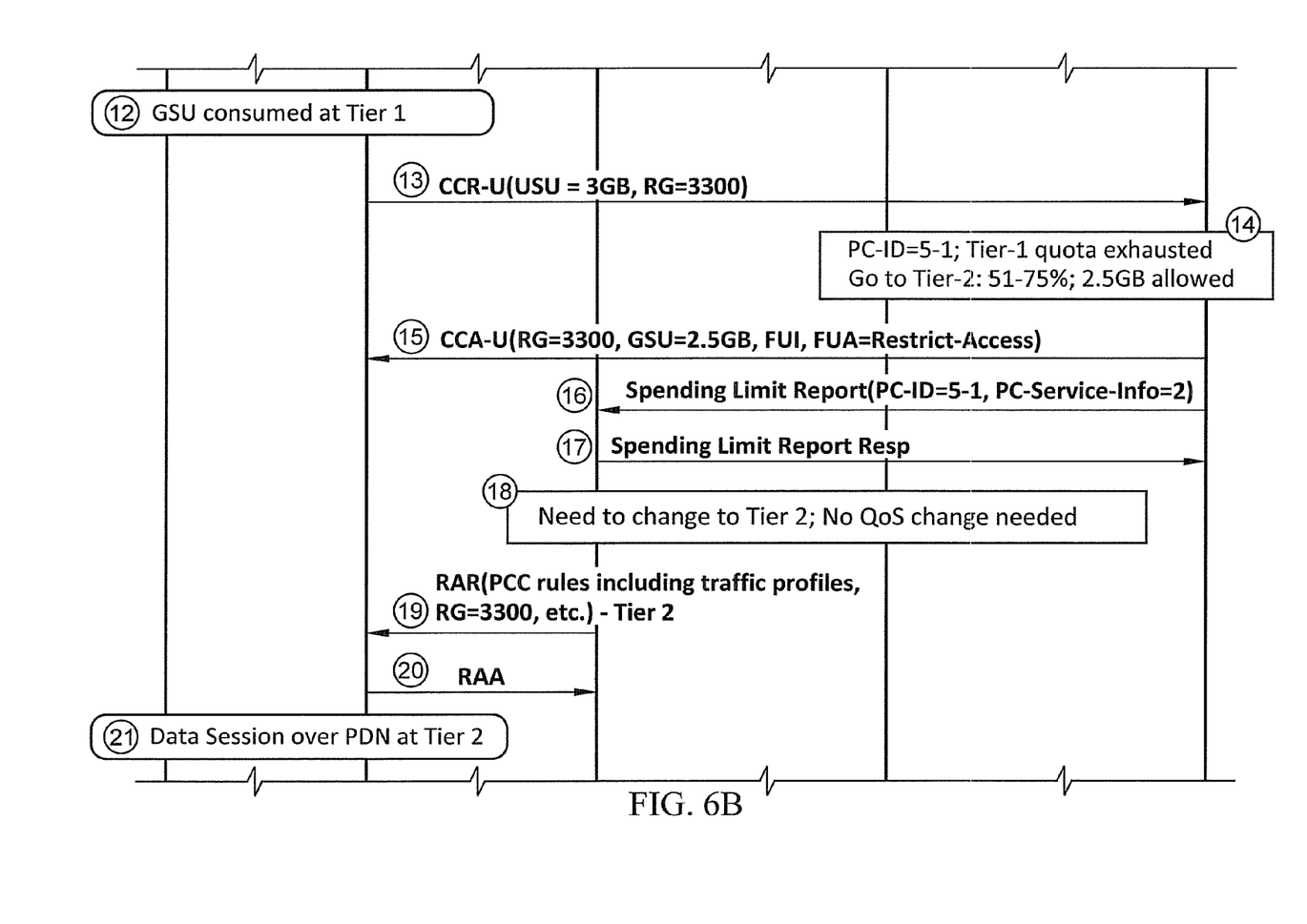

Referring to FIG. 6B, after some time, UE 112 consumes the remaining 3 GB in the current tier 1 quota. In one embodiment, PGW 108 monitors/tracks the data usage and sends a CCR message indicating the 3 GB usage by UE 112 to OCS 106. OCS 106 may then determine that the subscriber user's tier 1 quota is exhausted and that any further data usage will be consumed at tier 2, wherein 2.5 GB is allocated for use. Accordingly, OCS 106 may then send a CCA message containing the 2.5 GB GSU allocation information to PGW 108. OCS 106 may also be configured to send a spending limit report to PCRF 102 indicating a change from tier level 1 to tier level 2. PCRF 102 may respond with a spending limit report response. In this example, PCRF 102 determines that a change to tier 2 is needed, but no QoS change is required. PCRF 102 may then send an RAR message that indicates a change to tier level 2 to PGW 108. In one embodiment, the RAR message may comprise a PCC rule that includes the traffic profile associated with tier level 2. Upon receiving the RAR message, PGW 108 sends an RAA message as a response to PCRF 102. The data session over the PDN at tier level 2 is then conducted.

Figure 6C:
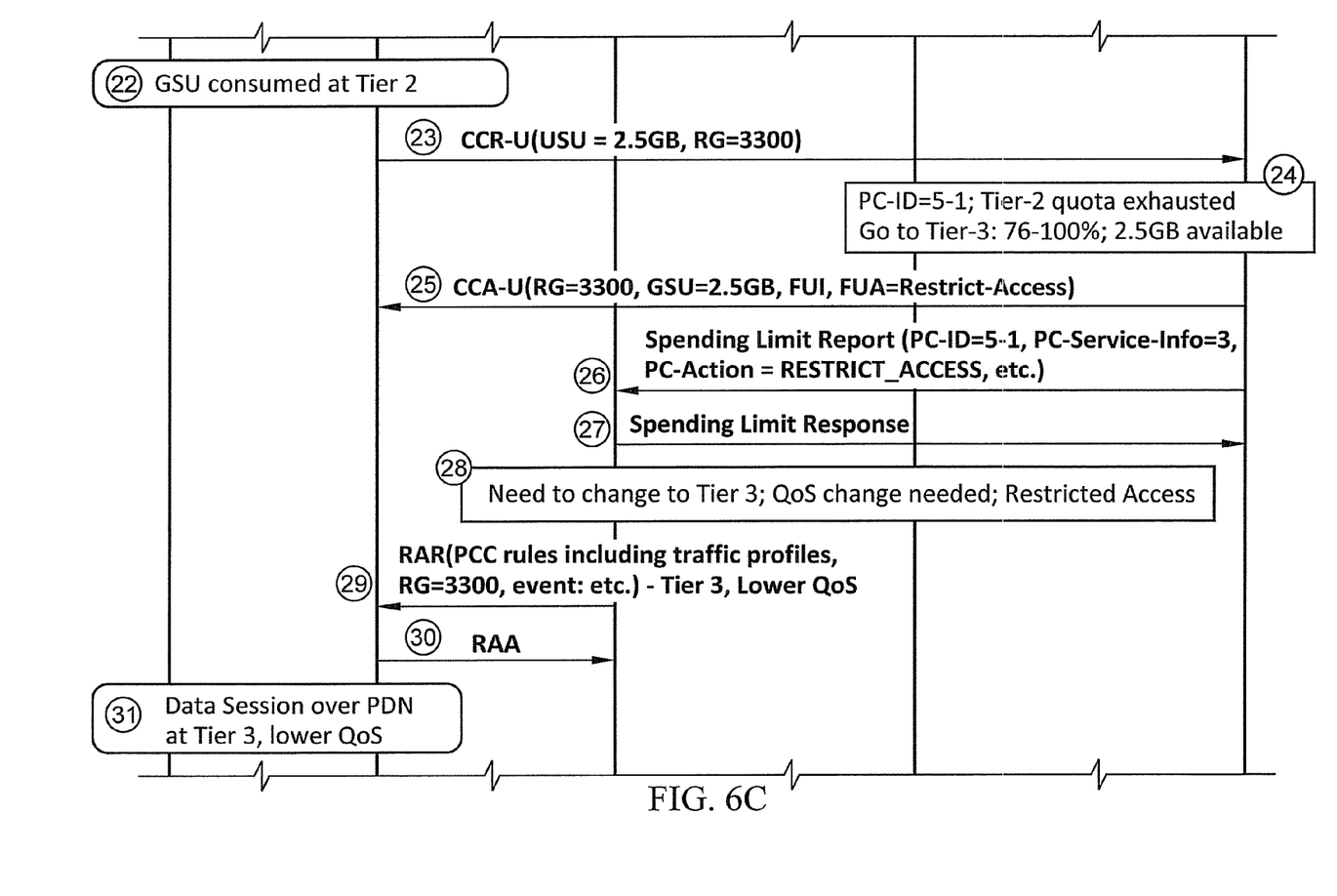

Referring to FIG. 6C, continuing with the example, UE 112 ultimately consumes 2.5 GB of the tier 2 quota. In one embodiment, PGW 108 monitors/tracks the data usage and sends a CCR message indicating the 2.5 GB usage to OCS 106. OCS 106 then determines that the subscriber's tier 2 quota is exhausted and that any further data usage will be consumed at tier 3, wherein an additional 2.5 GB is allocated for use. Accordingly, OCS 106 may then send a CCA message containing the 2.5 GB GSU allocation information to PGW 108. OCS 106 may also be configured to send a spending limit report to PCRF 102 indicating a change from tier level 2 to tier level 3 and restricted access is necessary. PCRF 102 may then, in turn, respond with a spending limit report response. PCRF 102 may also determine that a change to tier level 3 is needed and a QoS change and restricted access are required. Consequently, PCRF 102 sends a restricted access request (RAR) message containing PCC rules indicating a change to tier level 3 and restricted access to PGW 108. In one embodiment, the RAR message may indicate that tier level 3 should be implemented and that the QoS level should be lowered. Upon receiving the RAR message, PGW 108 sends an RAA message as a response to PCRF 102. The data session over the PDN at tier 3 (with a lower QoS per the PCC rule) is then conducted.

Figure 6D:
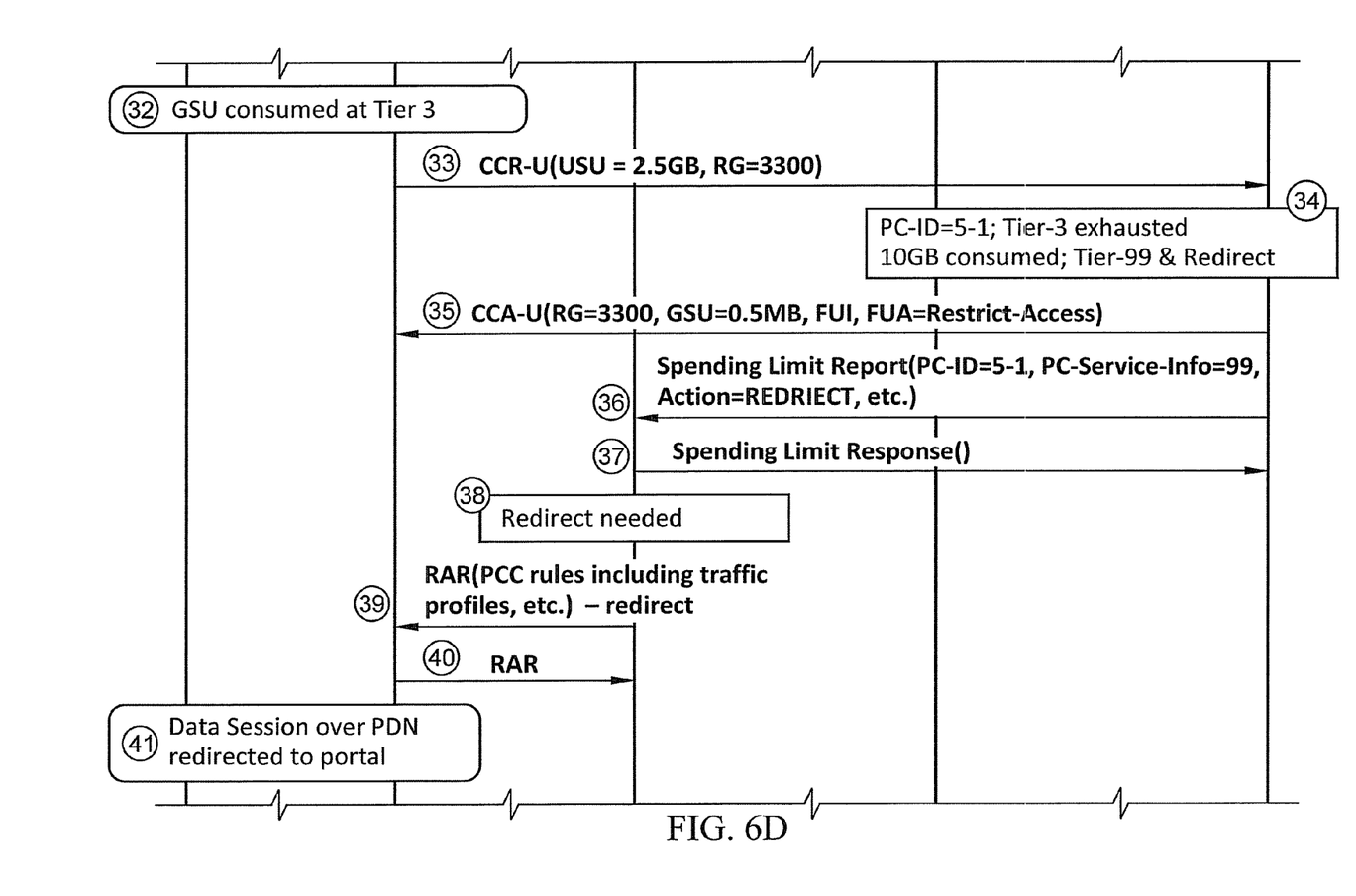

Referring to FIG. 6D, continuing the same example, UE 112 ultimately consumes 2.5 GB of the tier 3 quota. In one embodiment, PGW 108 monitors/tracks the data usage and sends a CCR message indicating the 2.5 GB usage to OCS 106. OCS 106 then determines that the subscriber's tier level 3 quota is exhausted, thus a total of 10 GB has been consumed. Accordingly, OCS 106 may then send a CCA message containing the GSU allocation information to PGW 108. OCS 106 may also be configured to send a spending limit report to PCRF 102 indicating that the service should be redirected. PCRF 102 may then in turn respond with a spending limit report response. In this example, PCRF 102 determines that a redirection change is needed and sends a RAR message to PGW 108. In one embodiment, the RAR message may comprise a PCC rule that indicates that the service should be redirected. Upon receiving the RAR message, PGW 108 sends an RAA message as a response to PCRF 102.

Figure 7:
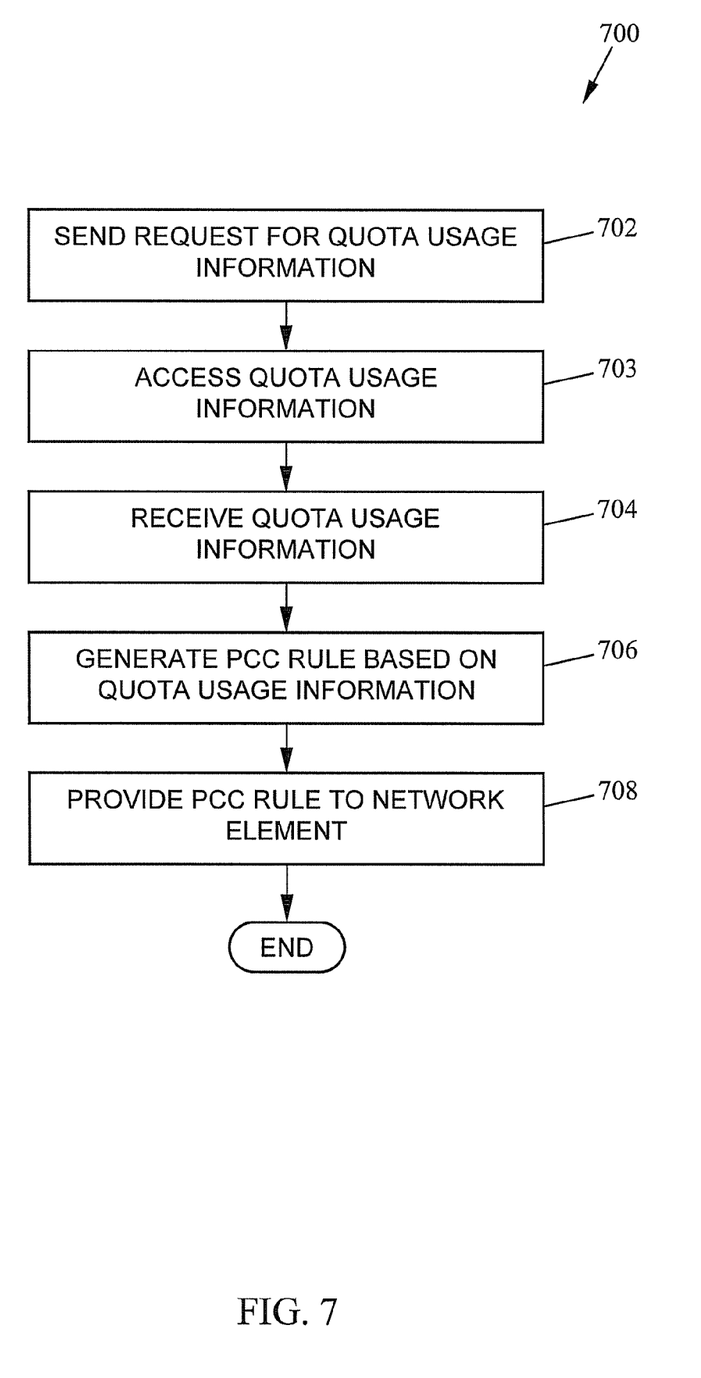
FIG. 7 is a flow chart illustrating an exemplary method for utilizing quota usage policy control in a Diameter-based communication network according to an embodiment of the subject matter described herein.

FIG. 7 is a flow chart illustrating an exemplary method 700 for utilizing quota usage policy control in a Diameter-based communication network according to an embodiment of the subject matter described herein. In step 702, a request for quota usage information is sent. In one embodiment, a subscription request or query message is sent by a PCRF to an OCS node. The subscription request message may include a subscriber user name and a PC-ID that comprises a plan identifier and a quota bucket identifier. The subscription request message may be sent to the OCS node via an Sy interface session.

In step 703, quota usage data associated with the subscriber user is accessed. In one embodiment, the OCS node may receive the subscription request message and extract the PC-ID information. The OCS node may also be configured to use the PC-ID to query a database to access quota usage data associated with the subscriber user.

In step 704, the requested quota usage information is received. In one embodiment, the PCRF may receive a response message containing the requested usage information from the OCS. The response message may include i) the current tier level for the quota bucket identifier and ii) the remaining quota bucket identifier quota available at the current tier level. In one embodiment, the response message may only include the remaining quota bucket identifier quota available at the current tier level if the original request message included a tier level identifier. In yet another embodiment, the received response message may include a notification message that includes the PC-Service-Info (i.e., the PC-Status information) that includes an indication that the tier level has changed or transitioned to another tier level. The notification message may also include additional data, such as consumed quota information or directives for the subscriber user. The notification may include any additional data. In some embodiments, the notification may include any kind of information as agreed in advance between the PCRF and the OCS. Notably, the response message may be communicated to the PCRF from the OCS via the Sy interface session.

In step 706, at least one PCC rule is determined. In one embodiment, the PCRF may utilize the quota usage information and network condition data to generate or determine one or more PCC rules. For example, if the PRCF determines that a tier level has changed, the PCRF may determine one or more threshold crossing actions to apply to subsequent data or signaling usage by the subscriber user. Notably the PCRF may generate a PCC rule containing the at least one threshold action.

In step 708, the at least one PCC rule is provided to a Diameter-based network element. In one embodiment, PCRF sends the at least one PCC rule to a Diameter-based network element, such as a PCEF. In other embodiments, the at least one PCC rule may be sent to a packet gateway, a Bearer Binding and Event Reporting Function (BBERF) node, deep packet inspection (DPI) function node, a traffic detection function (TDF) node, or any other Diameter based network element. Notably, the receiving network element may be configured to apply PCC rule actions to subsequent network use by the subscriber user. In one embodiment, the PCC rules may be used by the Diameter-based network element to modify one or more QoS policy attributes associated with a designated subscriber user. For example, the Diameter network element may apply a threshold crossing action included in the PCC rule(s) to data sent and received by UE associated with the subscriber user.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing quota usage policy control in a Diameter-based communication network, the method comprising:
at a policy server:
sending, to an online charging system (OCS) node, a request for quota usage information associated with a subscriber;
receiving the quota usage information and a quota tier level indicator associated with the subscriber from the OCS node;
generating at least one policy and charging control (PCC) rule for modifying a quality of service (QoS) policy attribute associated with the subscriber based on the quota usage information and the quota tier level indicator; and
communicating the at least one PCC rule to a Diameter network element.

2. The method of claim 1 wherein the policy server includes a policy and charging rules function (PCRF).

3. The method of claim 1 wherein modifying the QoS policy attribute includes applying, at the Diameter network element, a threshold crossing action to data sent and received by user equipment (UE) associated with the subscriber.

4. The method of claim 1 wherein a threshold crossing action includes at least one of: decreasing a download bitrate, decreasing the maximum allowable download bitrate, modifying an existing service data flow, and terminating an existing service data flow.

5. The method of claim 1 wherein the Diameter network element includes at least one of: a packet data network gateway (PGW), a policy and charging enforcement function (PCEF) node, a bearer binding and event reporting function (BBERF) node, a traffic detection function (TDF) node, and a deep packet inspection (DPI) function node.

6. The method of claim 5 wherein the QoS policy attribute is modified based on network condition data received from a PGW.

7. The method of claim 1 wherein generating at least one PCC rule includes generating the at least one PCC rule based on the quota usage information and the quota tier level indicator.

8. The method of claim 1 comprising determining, based on the received quota usage information, a current quota usage tier level at the policy server.

9. The method of claim 8 wherein the at least one PCC rule is generated based on the current quota usage tier level.

10. The method of claim 1 wherein the request for quota usage information includes a policy counter identifier (PC-ID).

11. The method of claim 10 wherein the OCS node utilizes the PC-ID to access the quota usage information associated with at least one of a plurality of subscription plan buckets associated with the subscriber.

12. The method of claim 11 wherein each of the subscription plan buckets comprises a plurality of tier levels and wherein each of the plurality of tier levels is associated with a traffic profile.

13. The method of claim 12 wherein the traffic profile includes data used to generate the at least one PCC rule at the policy server.

14. The method of claim 1 wherein the request for quota usage information is sent from the policy server to the OCS node via an Sy interface session.

15. A system for utilizing quota usage policy control in a Diameter-based communication network, the system comprising:
an online charging system (OCS) node configured to receive a request for quota usage information associated with a subscriber; and
a policy server configured to receive the quota usage information and a quota tier level indicator associated with the subscriber from the OCS node, to generate at least one policy and charging control (PCC) rule for modifying a quality of service (QoS) policy attribute associated with the subscriber based on the quota usage information and the quota tier level indicator, and to communicate the at least one PCC rule to a Diameter network element.

16. The system of claim 15 wherein the policy server includes a policy and charging rules function (PCRF).

17. The system of claim 15 wherein, at the Diameter network element, a threshold crossing action is applied to data sent and received by user equipment (UE) associated with the subscriber.

18. The system of claim 15 wherein a threshold crossing action includes at least one of: decreasing a download bitrate, decreasing the maximum allowable download bitrate, modifying an existing service data flow, and terminating an existing service data flow.

19. The system of claim 15 wherein the Diameter network element includes at least one of: a packet data network gateway (PGW), a policy and charging enforcement function (PCEF) node, a bearer binding and event reporting function (BBERF) node, a traffic detection function (TDF) node, and a deep packet inspection (DPI) function node.

20. The system of claim 19 wherein the QoS policy attribute is modified based on network condition data received from a PGW.

21. The system of claim 6 wherein the policy server is further configured to generate the at least one PCC rule based on the quota usage information and the quota tier level indicator.

22. The system of claim 15 wherein the policy server is further configured to determine, based on the received quota usage information, a current quota usage tier level at the policy server.

23. The system of claim 22 wherein the PCC rule is generated based on the current quota usage tier level.

24. The system of claim 15 wherein the request for quota usage information includes a policy counter identifier (PC-ID).

25. The system of claim 24 wherein the OCS node utilizes the PC-ID to access the quota usage information associated with at least one of a plurality of subscription plan buckets associated with the subscriber.

26. The system of claim 25 wherein each of the subscription plan buckets comprises a plurality of tier levels and wherein each of the plurality of tier levels is associated with a traffic profile.

27. The system of claim 26 wherein the traffic profile includes data used to generate the at least one PCC rule at the policy server.

28. The system of claim 15 wherein the request for quota usage information is sent from the policy server to the OCS node via an Sy interface session.

29. A non-transitory computer readable medium having stored thereon executable instructions that when executed by the processor of a computer control the computer to perform steps comprising:
- sending, to an online charging system (OCS) node, a request for quota usage information associated with a subscriber;
- receiving the quota usage information and a quota tier level indicator associated with the subscriber from the OCS node;
- generating at least one policy and charging control (PCC) rule for modifying a quality of service (QoS) policy attribute associated with the subscriber based on the quota usage information and the quota tier level indicator; and
- communicating the at least one PCC rule to a Diameter network element.

* * * * *